UNITED STATES PATENT OFFICE.

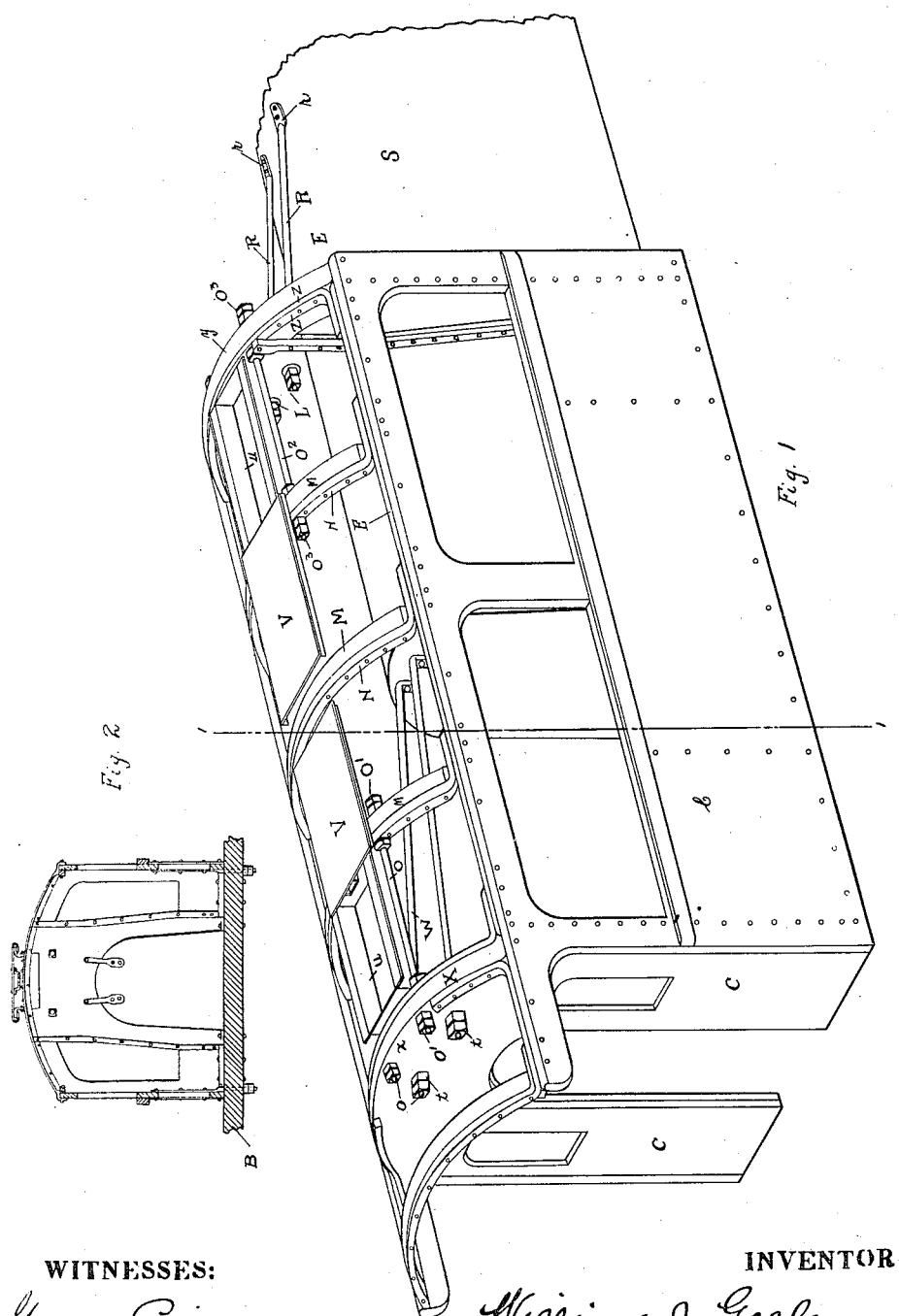

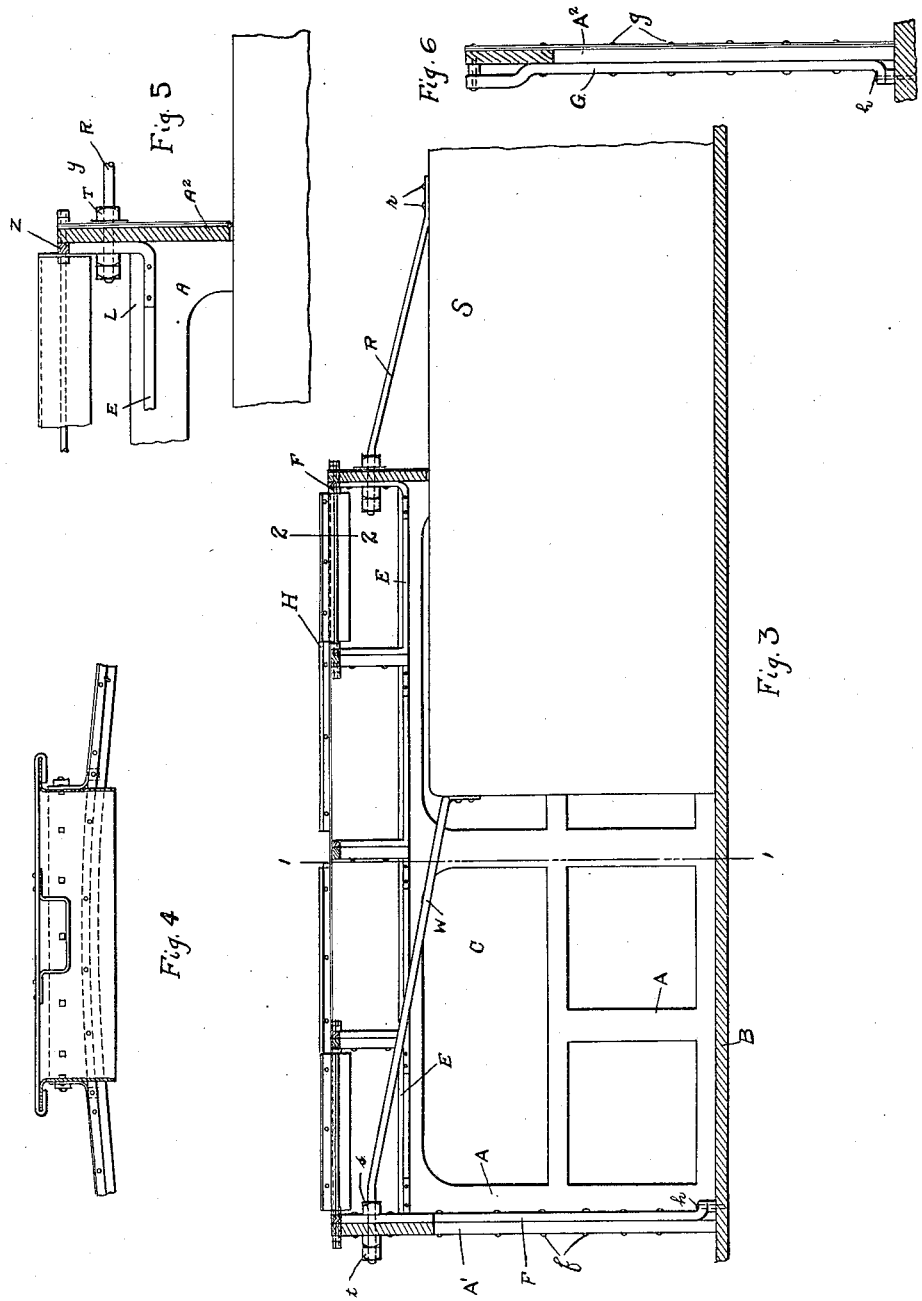

WILLIAM J. GOELZ, OF ALBANY, NEW YORK.

CAB FOR LOCOMOTIVE-ENGINES.

1,069,689.  Specification of Letters Patent. Patented Aug. 12, 1913.

Application filed April 10, 1913. Serial No. 760,272.

*To all whom it may concern:*

Be it known that I, WILLIAM J. GOELZ, a citizen of the United States of America, residing at the city of Albany, in the county of Albany and State of New York, have invented certain new and useful Improvements in Cabs for Locomotive-Engines, of which the following is a specification.

My invention relates to cabs for locomotive engines, and the object of my invention is to provide a cab which may be constructed of wrought iron, readily secured to a locomotive or removed therefrom, if injured, and returned thereto when repaired; together with such elements and combinations as are hereinafter more particularly set forth and claimed.

I accomplish these objects by means of the mechanism illustrated in the accompanying drawings, in which:

Figure 1 is a perspective view of my cab. Fig. 2 is a transverse section along the lines 1—1 on Fig. 1. Fig. 3 is a longitudinal section with parts broken away. Fig. 4 is a section along the lines 2—2 on Fig. 3. Fig. 5 is a detail sectional view showing the manner of connecting the rod to the roof. Fig. 6 is a detail elevation partly in section, showing the metal bar, G, connected with the wooden upright, $A^2$, and with the deck, B.

Similar letters refer to similar parts throughout the several views.

My cab consists of a wooden car as a framework covered with iron. I do away with flanges; the wood is put together by tongue and groove.

The cab is made of a wooden frame, A, A, resting upon the deck, B, of a car truck. To the uprights, A', $A^2$, at the front and rear of the frame, A, I secure the metal bars, F and G, by means of the bolts, $f$, $g$, and also bolt the bars, F and G, to the deck, B, by suitable bolts, $h$, $h$, as shown in Figs. 3 and 6. Along the wooden frame, A, near the top of the car, I place the metallic plate, E, extending from the front to the rear and on each side of the cab.

I have shown in Fig. 5 the manner of connecting the metallic plate, E, with the curved roof beam, Y, at one end of the cab, which is done by securing to the metallic plate, E, the curved plate, Z. I place the supporting braces, R, R, secured to the boiler, S, by suitable bolts, $r$, $r$. The braces are bent and inserted through the curved roof beam, Y, and are secured by the lock nuts, L. Upon the side and end of the cab I place the iron plate, C. The frame of the hood or cover is made up of the curved wooden roof beams, X, M, M, and Y, provided with iron cleats, N, N, Z, which are bolted to the beams and to the plate, E, as already described in reference to the plate, Z. Extending through the beam, X, at the forward end of the cab, and the next adjoining beam, M, are the tie rods, O, O, which unite the beams and are provided at their ends with lock nuts, O', O', thus holding securely in place the forward portion of the upper part of the cab, and at the same time they may be removed when desired. I also place the tie rods, $O^2$, $O^2$, similar to the tie rods, O, extending through the curved roof beams, Y and M, those nearest the rear of the cab, provided with the lock nuts $O^3$, $O^3$. As thus arranged there is provided for the swaying of the cab sidewise and the galloping thereof, when the motion is irregular, without tending to break or wrench the cab.

Passing through the beam, X, of the frame, A, at the front end of the frame, are rods, W, W, bolted to the end of the boiler, S, and bent near the ends where they pass through the sleeve, $s$, and beam, X, which rods are provided with lock nuts, $t$, $t$. I also place in the roof the ventilating openings, U, U, with suitable sliding covers V, V, therefor. The roof is covered by canvas or other suitable material, painted and made waterproof, if desired. As thus arranged the cab is removable and in case of accident may be readily taken off and repaired.

The metal bars, F and G, attached to the uprights, A', $A^2$, and to the deck, B, of the car truck, the metal plates, E, extending from the front to the rear on each side of the cab, the curved plates, Z, N, N, and the tie rods, O, O, and $O^2$, $O^2$, together form an iron frame reinforcing the wooden frame.

What I claim as my invention and desire to secure by Letters Patent is:

1. A railway locomotive cab in combination with a locomotive boiler; a wooden frame; iron supports for said frame; movable braces extending from near the top of the frame at front and rear thereof to the boiler.

2. A railway locomotive cab provided with a wooden frame; an iron reinforcing frame; iron plates forming the sides and ends of the cab; iron braces extending from the boiler of the locomotive to the frame; and means for adjusting or disconnecting said braces from the frame.

3. In a railway locomotive cab, a wooden frame; an iron reinforcing frame; iron plates on the outside of said frame; a roof comprising wooden beams; sliding covers for ventilating openings therein; and iron braces extending from the front and rear of the roof to the boiler.

In testimony whereof I have affixed my signature in presence of two witnesses.

WILLIAM J. GOELZ.

Witnesses:
 MYRA J. SNOW,
 ANNA E. CORBETT.

---

Copies of this patent may be obtained for five cents each, by addressing the "Commissioner of Patents, Washington, D. C."